UNITED STATES PATENT OFFICE.

RICHARD H. SANDERS, OF PHILADELPHIA, PENNSYLVANIA.

AGGLOMERATED IRON ORE AND PROCESS OF MAKING SAME.

SPECIFICATION forming part of Letters Patent No. 516,710, dated March 20, 1894.

Application filed March 27, 1893. Serial No. 467,840. (No specimens.)

*To all whom it may concern:*

Be it known that I, RICHARD H. SANDERS, a citizen of the United States, residing at Philadelphia, in the county of Philadelphia and State of Pennsylvania, have invented a certain new and useful Improvement in Agglomerated Iron Ore and Process of Making the Same, of which the following is a true and exact description.

My invention relates to the treatment of finely divided iron ore precipitated from various chemical operations or such as is found in nature or made artificially in the form known as iron sand; this sand being usually separated from impurities by magnetic separators. Heretofore much trouble has been found in handling these finely divided iron ores, not only from loss in handling and transportation but from the fact that the fine particles are to a large extent carried out of the blast furnace in which they are charged, and deposited in the dust chambers or carried away and lost altogether.

The object of my invention is to agglomerate such iron ores into masses suitable for charging into a furnace and by a method which does not involve the reduction of the ore and which can be carried on rapidly and at small expense.

I have discovered that the finely divided ores of iron can be agglomerated into masses of suitable size and without material injury to its quality as an ore, by, so to speak, cementing the particles of ore together through the medium of a slag. Preferably the slag, or slag forming material is brought to a fine state of division and thoroughly mixed and incorporated with the ore, and then the mixture subjected to the action of a sufficient degree of heat to cause the fusion or formation and fusion of the slag, the entire mass at this point becoming more or less pasty and the particles of ore being cemented together by a film of slag filling or partly filling the intercommunicating interstices.

While, as above indicated I contemplate the use of finely divided slag, such for instance, as is withdrawn from an iron blast furnace I prefer to practice my process by mixing with the finely divided ore, material such as wood ash or coal ash, which at a temperature considerably below that at which the ore will fuse will combine with a portion of the ore to form a slag, and in practice I have found that an admixture with the ore of coal ash in weight, approximately five per cent. of the ore, will produce when heated to a temperature indicated by a medium red a slag sufficient in quantity and kind to thoroughly agglomerate the ore with which it is admixed.

When I use a previously formed slag to mix with the finely divided ore I find that the desired result can be obtained with a quantity of approximately five per cent. by weight of such slag when the ore and slag are thoroughly mixed together before heating, which is my preferred method of forming the agglomeration of ore. Masses suitable for treatment in a furnace may be formed also by mixing the finely divided ore with previously melted slag, in which case, however, it is in practice necessary to use a larger quantity of slag.

Having now described my invention, what I claim as new, and desire to secure by Letters Patent, is—

1. As a new article of manufacture, masses of finely divided iron ore the particles of which are cemented together by slag.

2. The method of forming finely divided iron ore into masses suitable for charging into a furnace which consists in mixing the ore with finely divided slag forming material and subjecting the mixture to heat sufficient to fuse the slag and cement the ore particles together.

3. The method of forming finely divided iron ore into masses suitable for charging into a furnace which consists in mixing the ore with finely divided slag and heating said mixture to fuse the slag and cement the ore particles together.

RICHARD H. SANDERS.

Witnesses:
LISLE STOKES,
JOSEPH SWEENEY.